United States Patent [19]

Inoue

[11] 4,108,357
[45] Aug. 22, 1978

[54] FEED-RATE INDICATOR FOR ELECTROCHEMICAL GRINDING

[75] Inventor: Kiyoshi Inoue, Tokyo, Japan

[73] Assignee: Inoue-Japax Research Incorporated, Kanagawaken, Japan

[21] Appl. No.: 799,971

[22] Filed: May 24, 1977

[30] Foreign Application Priority Data

May 26, 1976 [JP] Japan .................................. 51-59972

[51] Int. Cl.² ........................ G06C 27/00; G06C 3/00;
[52] U.S. Cl. .................................. 235/119; 235/88 R; 204/224 M;
[58] Field of Search ................ 204/225, 224 M, 129.2, 204/129.25, 129.46; 235/83, 84, 88, 119

[56] References Cited

U.S. PATENT DOCUMENTS

| | | | |
|---|---|---|---|
| 3,694,340 | 9/1972 | Takahashi | 204/224 M |
| 3,905,161 | 8/1975 | Tomita et al. | 204/129.2 |

Primary Examiner—John H. Mack
Assistant Examiner—D. R. Valentine
Attorney, Agent, or Firm—Karl F. Ross

[57] ABSTRACT

An electrochemical grinding process is controlled by the use of a feed-rate indicating device which calculates and displaces the feed-rate (V) of a workpiece and a grinding wheel which are displaced relatively toward one another. The feed rate V is determined by the relationship $$V = A p/h + B/\sqrt{h}$$

where $h$ is the cutting depth, $p$ is the force for driving the wheel electrode in terms of nominal kilowatt power rating P per unit width $w$ of the cutting area, and A and B are constants. These constants are determined between values of A of 150 to 156, exclusive, and values of B from 5.8 to 11.4, exclusive for current densities of 60 to 80 amperes cm², respectively, by extrapolation.

4 Claims, 14 Drawing Figures

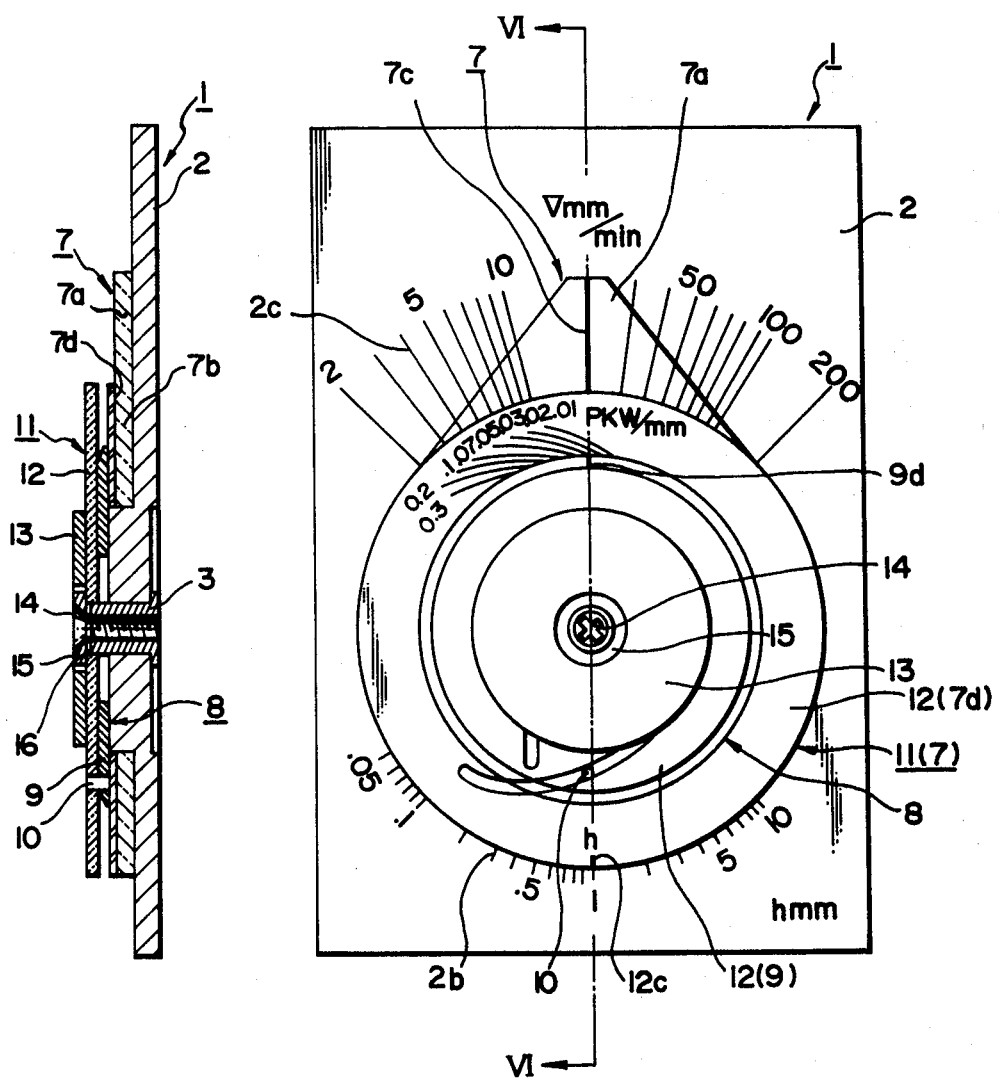

FIG. 9
FIG. 10
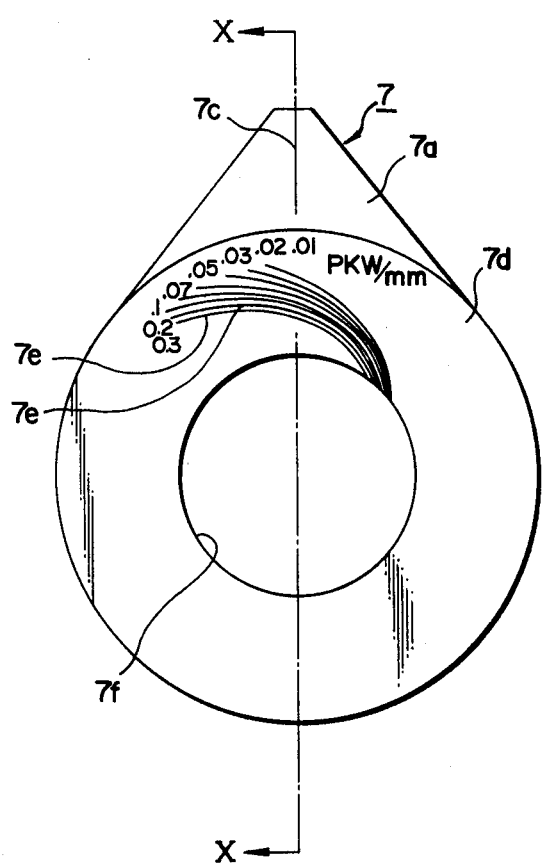
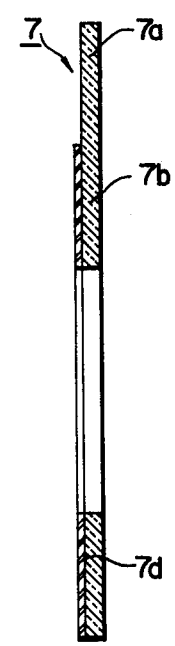

FIG. 13
FIG. 14
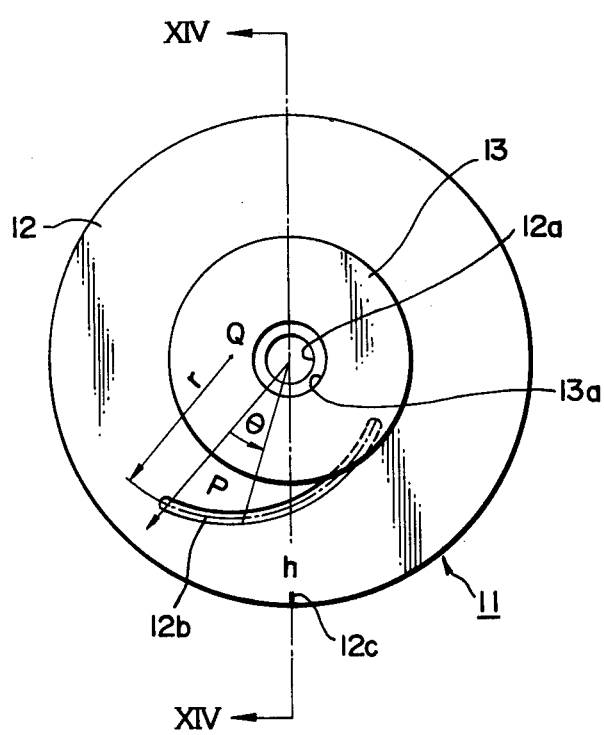
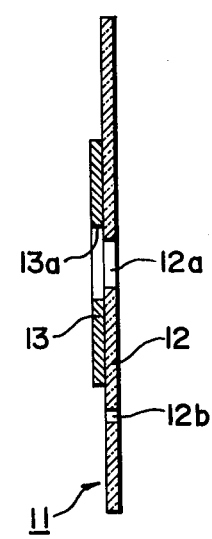

FEED-RATE INDICATOR FOR ELECTROCHEMICAL GRINDING

FIELD OF THE INVENTION

The present invention relates to electrochemical grinding and, more particularly, to a feed-rate indicating device for electrochemical grinding which is capable of calculating and displaying an optimum feed rate of a workpiece to be advanced relatively toward a wheel electrode in the course of electrochemical grinding so as to most efficiently achieve the purpose and satisfy the conditions of a particular grinding operation desired.

BACKGROUND OF THE INVENTION

The determination of the feed rate which must be variably established in successive stages of a given grinding operation, i.e. in transient periods which are immediately after commencement and immediately before the ending and in an intermediate stage in which the grinding load is constant, has been a problem in conventional electrochemical-grinding practice inasmuch as each determination is entirely left to the judgment of the operator based on his experience. Thus, accomplishing a given operation in the shortest total grinding time and with the best finishing quality has essentially required a high degree of operator skill.

OBJECT OF THE INVENTION

It is therefore the object of the present invention to provide a solution to this disadvantage of the prior art and which enables even an unskilled operator to readily accomplish a given electrochemical grinding job efficiently and with a high reliability and precision.

SUMMARY OF THE INVENTION

While numerous factors are involved in its strict determination, it has now been found that for practical purposes an optimum feed rate can be established by maintaining the electrochemical current density at suitable levels and this can be attained in consideration of the output rating of a motor which drives the wheel electrode, the cutting width and depth of stock removal from the workpiece and the type of the wheel electrode.

More specifically, where, for example, electrochemical grinding is to be conducted with a vitrified abrasive wheel as the electrode, it is desirable and satisfactory for the above purpose to maintain the current density at 60 to 80 amperes/cm² and, preferably, around 70 amperes/cm² and the feed rate V mm/min. can then be established with the following formula:

$$V = A p/h + B/\sqrt{h} \quad (1)$$

where $p$ is the wheel drive force $p$ per unit cutting width $w$ or $P(kW)/w(mm)$, $h$ is the cutting depth (mm), and A and B are constant. Constants A and B are given as follows:

With a current density of 60 amperes/cm² with which grinding is conducted, $$\left. \begin{array}{l} A = A_{60} = 156 \\ B = B_{60} = 5.8 \end{array} \right\} \quad (2)$$

With a current density of 80 amperes/cm², $$\left. \begin{array}{l} A = A_{80} = 152 \\ B = B_{80} = 11.4 \end{array} \right\} \quad (3)$$

When machining is to be effected with a current density D between 60 and 80 amperes/cm², linear interpolation will give $A_D$ and $B_D$ as is apparent. For example, with current density of 70 amperes/cm², $$\left. \begin{array}{l} A = A_{70} = \dfrac{A_{60} + A_{80}}{2} = 154 \\ B = B_{70} = \dfrac{B_{60} + B_{80}}{2} = 8.6 \end{array} \right\} \quad (4)$$

Thus, in accordance with the present invention, there is provided a feed-rate indicating device for electrochemical grinding constructed to calculate and display the feed rate (V) of a workpiece to be advanced relatively toward a wheel electrode using the formula: $V = A(P/h) + B(l/\sqrt{h})$ where $h$ is the cutting depth, $p$ is the force for driving the wheel electrode per unit width of the cutting area, and $A$ and $B$ are constant.

Specifically, the cutting depth $h$ is expressed in mm, the driving force $p$ is expressed in kW/mm, the feed rate $V$ is expressed in mm/min., the constant $A$ is a value selected from the range between 152 and 156 and the constant $B$ is a value selected from the range between 5.8 and 11.4.

In the accompanying drawing:

BRIEF DESCRIPTION OF THE DRAWING

FIG. 5 is a plan view illustrating a feed-rate calculating indicator unit constituting an embodiment of the invention;

FIG. 6 is a longitudinal cross-sectional view of the illustrated calculating indicator unit taken along line VI—VI of FIG. 5;

FIG. 9 is a plan view of a main indexing plate as part of the illustrated calculating indicator unit;

FIG. 10 is a cross-sectional view of the main indicating plate taken along line X—X;

FIG. 13 is a plan view showing a cutting-depth setting plate as part of the illustrated calculating indicator unit; and FIG. 14 is a cross-sectional view taken along line XIV—XIV of FIG. 13.

SPECIFIC DESCRIPTION

Figure 1:
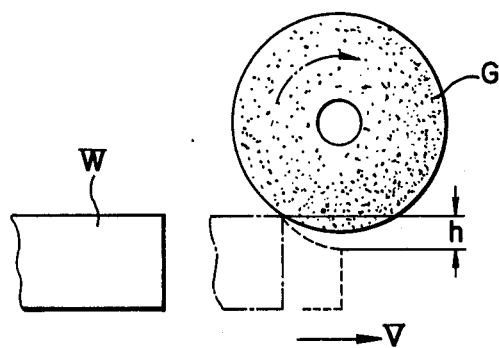
FIGS. 1 to 4 are diagrammatic sectional views indicating quantities constituting bases for calculation to embody the invention.

In FIG. 1, a workpiece W is shown advanced toward a grinding wheel electrode G which is being rotated in the direction of arrow by a motor (not shown) which has a rated output or drive force P. Electrochemical grinding action commences when the workpiece W reaches the position indicated by the dot-dash line and proceeds in a transient mode until it passes through the position indicated by the dash line and the cutting depth $h$ is reached whereafter machining continues with a constant cutting load. It is the feed rate from this point which the calculating unit according to the invention may primarily be utilized although a corresponding calculation is also possible even in the transient stage if necessary factors such stock removal in that stage are known.

Figure 3:
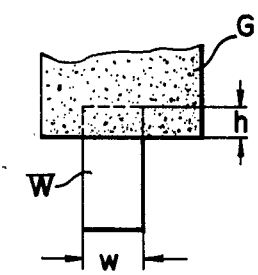
Figure 2:
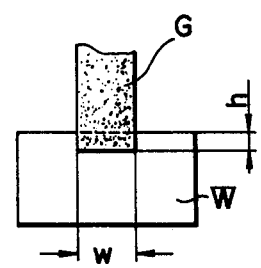
Figure 4:
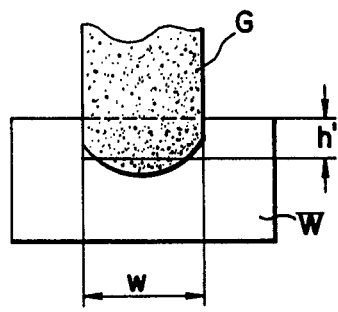

The cutting width is also shown in FIGS. 1 to 4 and designated by $w$. FIGS. 2 and 3 show a grinding wheel which is cylindrical and hence has a uniform cutting depth. In case the wheel is noncylindrical, the effective cutting depth $h'$ should be used as shown in FIG. 4.

Figure 8:
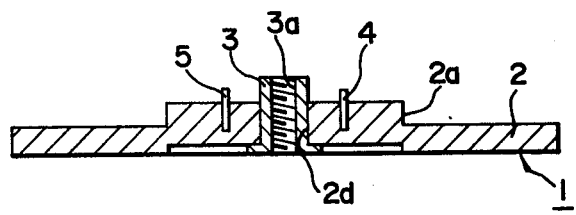
FIG. 8 is a transverse cross-sectional view of the base plate taken along line VIII—VIII of FIG. 7.
Figure 7:
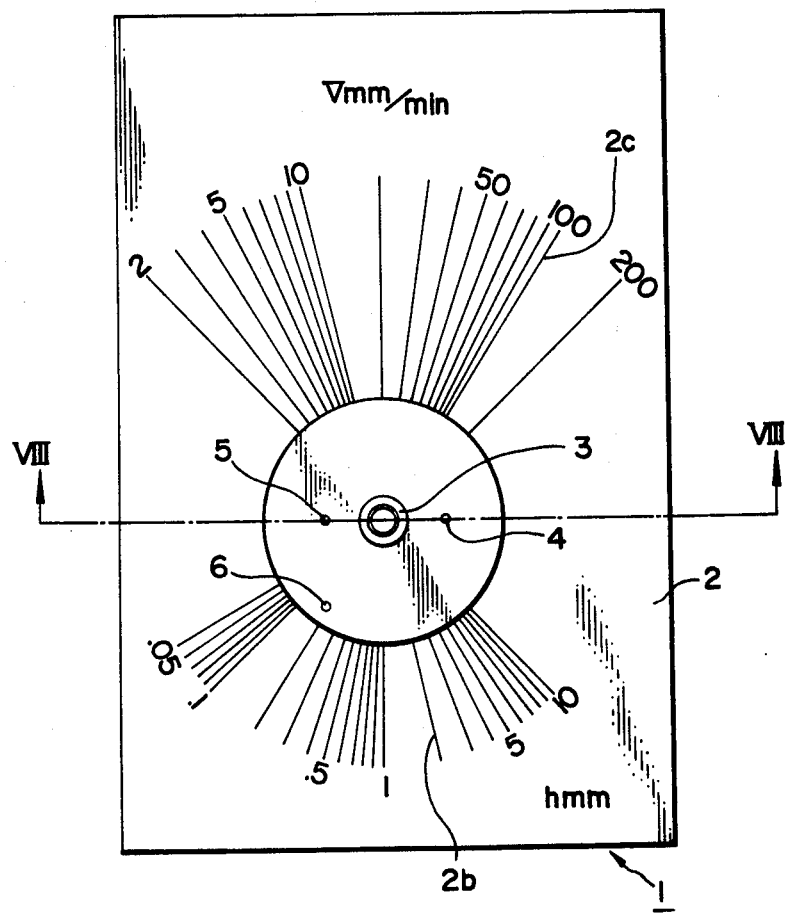
FIG. 7 is a plan view of a base plate as part of the illustrated calculating indicator unit.
Figure 11:
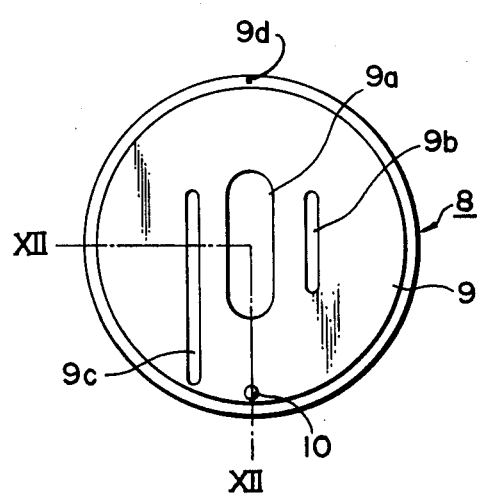
FIG. 11 is a plan view of an auxiliary indexing plate as part of the illustrated calculating indicator unit.
Figure 12:
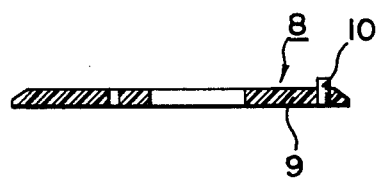
FIG. 12 is a cross-sectional view taken along lines XII—XII of FIG. 11.

Referring now to FIGS. 5 to 14, the illustrated calculating indicator unit has a base plate 1 comprising a rectangular plastic plate 2 which, as shown in FIGS. 7 and 8, is formed with a thin cylindrical boss 2a. Outwardly from the boss 2a and radially extending from the center thereof on the surface of the plate 2, there are provided logarithmic scales 2b and 2c representing the cutting depth $h$ and the feed rate V, respectively. The cutting depth $h$ and the feed rate V are here expressed in mm and mm/minute, respectively. Formed coaxially with the boss 2a is an aperture 2d to which is fitted a shaft 3 having a female screw 3a therein. Implanted in the boss 2a and projecting therefrom are guide pins 4, 5 and 6 whose functions will be described later.

Shown at 7 (FIGS. 5, 6, 9 and 10) is an indexing plate which will be called herein the main indexing plate composed of a transparent plastic and having an upwardly projecting portion 7a, here in a trapezoid-like form, and a ring portion 7b with an index line 7c being provided on the projecting portion 7a along the center line thereof. The ring portion 7b has a non-transparent coating 7d applied thereto on which are drawn a multiplicity of curves 7e corresponding to value of p: the wheel rotary drive force (P)/the cutting width (w) employed.

The central opening 7f of the ring 7b is slidably fitted with the boss 2a to rotatably mount the body of the main indexing plate 7 on the surface of the base plate 2 so that the value of the V calculated may be indicated by the position of the index 7c.

Shown at 8 is an indexing plate which will be called herein the auxiliary indexing plate or disk comprised of a tapered, non-transparent plastic disk plate 9 having a pin 10 implanted therein. As seen from FIG. 6, the pin 10 is provided at a location adjacent to the periphery of the disk 9 and projected from the narrower surface of the tapered disk 9. As seen from FIG. 11, the plate 9 is formed with an elongated aperture 9a with its longitudinal line of center extending through the center of the disk 9 and the center of the pin 10. The aperture 9a in its width is adapted to receive the shaft 3 projecting from the base 2. In addition, in parallel with the aperture 9a there are formed two other elongated apertures 9b and 9c which are narrower than the aperture 9a. The aperture 9b is adapted to receive the guide pin 4 of the base 1 and the aperture 9c is adapted to receive two pins 5 and 6 disposed in line vertically on the base 1. Shown at 9d is an auxiliary index provided at a location on the periphery of the disk 9 and diametrically opposite to the pin 10.

The auxiliary indexing disk 9 is placed on the boss 2a with the shaft 3, the guide pin 4 and the two guide pins 5 and 6 inserted in the apertures 9a, 9b and 9c, respectively so that the disk 9 may displace slidingly on the boss 2a in the direction in parallel with the line connecting the centers of the pins 5 and 6.

Shown at 11 is a cutting-depth setting disk which comprises a transparent plastic ring 12 and a smaller ring 13 arranged coaxially and bonded together. The ring 12 has a central opening 12a, an elongated curved guiding aperture 12b and a cutting-depth setting index 12c(h). The elongated curved aperture 12b has a width adapted to receive the pin 10 to guide the latter and a curve represented by a function corresponding to the formula mentioned previously. The central opening 13a of the smaller ring 13 is larger in diameter than that of the ring 12.

The cutting-depth setting disk 11 is positioned over the auxiliary indexing disk 8 with the shaft 3 from the base 2 and the guide pin 10 inserted in the central opening 12a and the guiding aperture 12b, respectively.

As shown in FIG. 6, a plow bolt 14 is screwed into the female screw 3a at the shaft 3 via a washer 15 and a spring washer 16. With the washer 15 tightly fastened against the shaft 3 by the plow bolt 14, the ring 12 of the cutting-depth setting disk 11 and the auxiliary indexing disk 8 are sandwiched lightly and slidably one on the other between the washer 15 and the boss 2a or the plate 2 and the main indexing plate 7 is sandwiched rotatably between the auxiliary indexing disk 8 and the plate 2.

The cutting-depth setting disk 11 is arranged to be rotatable around the shaft 3 over a predetermined angle of rotation which corresponds to the range of graduations of the cutting-depth scale 2b provided on the base plate 2. With reference to scales and arrangements illustrated in FIG. 5, while the cutting-depth setting disk 11 is rotated counterclockwise from one end to the other, the index 12c will displace from the minimum graduation to the maximum graduation of the established range of the cutting-depth. Simultaneously, the pin 10 on the auxiliary indexing disk 8 guided by the aperture 12b of the cutting-depth setting disk 11 will displace in the direction receding from the position of the shaft 3 to displace the indexing disk 8 upwardly relative to the main indexing plate 7 (as well as to the base plate 2 and the cutting-depth setting disk 11).

When the index 12c points to the minimum graduation of the cutting-depth scale, the pin 10 will position at the innermost end of the guiding aperture 12b and the shaft 3, the pins 4 and 6 will position at the lowermost ends of the apertures 9a, 9b and 9c, respectively. Conversely, when the index 12c points at the maximum graduation of the cutting-depth scale, the pin 10 will position at the outermost end of the guiding aperture 2b and the shaft 3, the pins 4 and 5 will position at the uppermost ends of the apertures 9a, 9b and 9c, respectively.

The manipulation of the illustrated calculating indicator unit will now be evident. After pointing the index 12c of the setting disk 11 at a relevant graduation of the cutting-depth scale on the base plate 2, the main indexing plate 7 may be manipulated so as to point the index 9d at a relevant graduation of p, the wheel drive force per unit cutting width, on the plate 7 and then a relevant graduation feed-rate value (graduation) will be indicated on the feed-rate scale on the base plate 2 by the index 7c.

Any appropriate function may be used to determine the guiding curve of the aperture 12b. Thus, the curve represented thereby may be an arc, as shown in FIG. 13, with its fixed center at point Q and radius $r$. Alternatively, it may, for example, be a straight line, an involute or a trochoid. Curves 7e, p(kW/mm), on the main indexing plate, of course, vary according to the type of the function utilized.

Each individual curve 7e may be drawn by successively substituting a given value of $p = (P/w)$ and various values of $h$ into the formula (1) referred to herein to obtain corresponding values of $V$. The cutting-depth disk 11 and the main indexing plate 7 are successively positioned corresponding to the selected values of $h$ and the calculated values of $V$ to obtain a trace that the point of the index 9d of the auxiliary indexing disk 8 draws on the main indexing plate 7.

I claim:

1. A device for automatically calculating the feed rate of a workpiece relative to an electrochemical grinding wheel in an electrochemical grinding operation comprising:

a base plate provided with indicia of the feed rate V along one portion of a circle having a center and indicia of the cutting depth $h$ along another portion of a circle having the same center as the first circle;

a rotatable first member mounted on said plate and rotatable about said center, said first member carrying an index cooperating with said indicia of feed rate V and being provided with indicia of the drive force p per unit width of the cutting area;

a second member rotatable about said center and provided with an index cooperating with said cutting depth indicia h;

a third member displaceable on said base and provided with an index cooperating with the indicia $p$ of said drive force; and mechanical means connecting said members for mutual and relative movement whereby said indexes cooperate with the respective indicia V, $p$ and $h$ in accordance with the relationship $V = Ap/h + B/\sqrt{h}$, where A and B are constants.

2. The device defined in claim 1, wherein the cutting-depth $h$ is expressed in mm, the drive force $p$ per unit width of the cutting area is expressed in kW/mm, the feed rate V is expressed in mm/minute, the constant A is selected from a range between 152 and 156 and the constant B is selected from a range between 5.8 and 11.4.

3. A device for automatically calculating the feed rate of a workpiece relative to an electrochemical grinding wheel in an electrochemical grinding operation comprising:

a base-plate member provided with first indicia along a portion of a circle having a center;

a rotatable first member mounted on said base plate member and rotatable about said center, said first member carrying an index cooperating with said first indicia and being provided with second indicia, one of said base-plate and first members being provided with third indicia;

a second member rotatable about said center and provided with an index cooperating with said third indicia;

a third member displaceable on said base and provided with an index cooperating with the second indicia, one of said indicia being the feed rate $V$, L another of said indicia being the cutting depth $h$, and the remaining indicia being the drive force $p$ per unit width of the cutting area; and mechanical means connecting said first, second and third members for mutual and relative movement whereby said indexes cooperate with the respective indicia V, $p$ and $h$ in accordance with the relationship $V = Ap/h + B/\sqrt{h}$ where A and B are constants.

4. The device defined in claim 3, wherein the cutting-depth $h$ is expressed in mm, the drive force $p$ per unit width of the cutting area is expressed in kW/mm, the feed rate V is expressed in mm/minute, the constant A is selected from a range between 152 and 156 and the constant B is selected from a range between 5.8 and 11.4.

* * * * *